L. TROOST.
RAILWAY REGISTER.
No. 19,176. Patented Jan. 19, 1858.
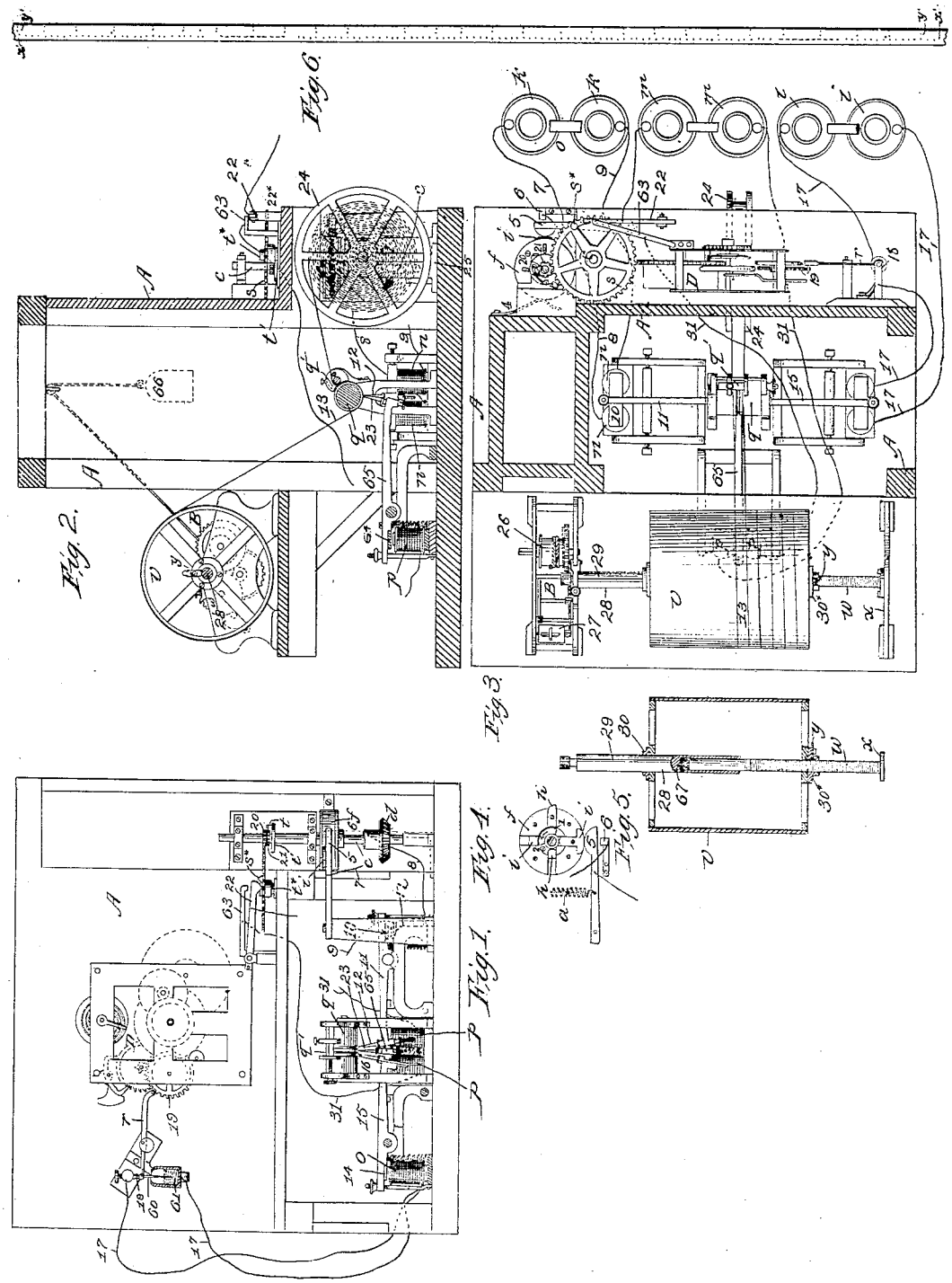

UNITED STATES PATENT OFFICE.

LEWIS TROOST, OF MOBILE, ALABAMA, ASSIGNOR TO JOHN A. M. BATTLE.

IMPROVED METHOD OF REGISTERING THE SPEED AND BACK OR FORWARD DISTANCES PASSED OVER BY RAILROAD-TRAINS BY MEANS OF ELECTRO-GALVANIC BATTERIES.

Specification forming part of Letters Patent No. 19,176, dated January 19, 1858.

*To all whom it may concern:*

Be it known that I, LEWIS TROOST, in the city of Mobile, in the county of Mobile and State of Alabama, have invented a new and useful System of Registering the Performance of Railway-Trains; and I do hereby declare that the following is a full, clear, and exact description of the same, reference being had to the accompanying drawings, forming part of this specification, in which—

Figure 1 is an elevation of the apparatus employed in carrying out my invention. Fig. 2 is a vertical section of the same at right angles to Fig. 1. Fig. 3 is a plan of the same. Figs. 4 and 5 are views of details of the apparatus, which will be hereinafter explained. Fig. 6 is a face view of a strip of paper on which the registration or record is made, exhibiting the character of the record.

Similar letters of reference indicate corresponding parts in the several figures.

This invention consists, first, in the registration of every second or other interval of time that elapses between the departure of a railway-train and its arrival at its destination by a series of marks produced in one or more lines by a pen, style, or other marking-instrument on a strip or sheet of paper or any other suitable surface, and the registration upon the same surface of every one or more revolutions of one of the wheels of the train, or of any wheel attached to one of the cars and running on the tracks, by one or more series of marks produced in one or more lines parallel with or otherwise conveniently contiguous to the line or lines of registration of time, by means of one or more pens, styles, or other marking instruments whose operations are controlled by the said wheel, by the comparisons of which registrations of time and distance—the registration of the revolutions of the wheel being, as will be readily understood, a registration of distance—the exact rate of the train at any time can be determined, and the register of time proceeding when the train is stationary indicates the length of time of the stoppages, the localities of which are also indicated by a comparison with the registration of distance.

The invention consists, secondly, in causing marks of a different character to those produced by the revolutions of the wheel in running forward to be produced in running backward, such marks being continued in the same line or lines, or nearly so, as those registering the forward revolutions of the wheel, so as to enable them to be compared with the registration of time to show the time occupied in backing, the different characters of the marks produced by the forward and backward revolutions of the wheel serving also to indicate the localities of the backing-places, and, by enabling the number of backward revolutions to be deducted from the number of forward ones, serving to determine the exact distance made by the train.

By the combination of the two above-stated features of my invention a system of registration is obtained by which the circumstances attending the trip of a train are indicated in a manner convenient for inspection and a check is held on engineers and conductors of trains by showing whether the trains are run according to instructions.

The apparatus will generally be placed in the baggage-car of a train, that being the most convenient place for it, though it may be placed in any other car.

A A is a framing, which supports all the working parts of the apparatus.

*c* is an upright shaft furnished with a bevel-gear, *d*, which is supposed to be geared with another wheel on one of the axles of the truck by means of an intermediate shaft and gears suitably arranged to admit of the movements of the truck in turning curves, such gearing being so proportioned that the shaft *c* makes the same number of revolutions with the axle, or that it makes one revolution for any given distance traveled by the train. The shaft *c* carries a wheel, *f*, (shown in Figs. 1, 2, and 3, and also in Fig. 4, the latter of which figures exhibits a top view of it with an outer plate removed,) said wheel being set loosely on the shaft *c* and rotated by a cam, 1, (see Fig. 4,) that is fast on the said shaft, coming in contact with a stud, 2, secured in the wheel. A friction-spring, 4, (see Fig. 3,) applied to the wheel *f*, causes it to remain stationary, if the train commences to back, during about one-quarter of a revolution of the shaft *c*, or until the cam 1 comes round against the opposite side of the stud 2 to that with which it is in contact when the train is moving forward. The cam, in its motion, throws out from the periphery of the wheel $f$ one of two slides, $h\ i$, according to the direction of its revolution, at the same time drawing in the other one, the said slides being fitted radially within the wheel and being slotted to receive the cam. The end of the slide $h$ has a small stud-point, and when projected from the wheel $f$, as it is when the train is moving forward and the wheel $f$ rotating in the direction of the arrow shown in Fig. 4, acts to close for an instant an electric circuit between a lever, 5, and spring-post 6 once in every revolution of the said wheel, to cause the revolution of the said wheel to be registered by a dot on a strip of paper, as will be hereinafter described; but if the slide $i$ be projected, as is the case when the train is backing, its end which is wide will, in passing the lever 5 and forcing the same against the post 6, cause the said spring and post to remain in contact for a longer time than the pointed end of the slide $h$ and produce a registration in the form of a dash instead of a dot.

The lever 5 has a spring, $a$, applied in such a manner as to pull it away from the post 6, so that the said spring and post only remain in contact while the projected slide $h$ or $i$ is in contact with the lever.

7 is a wire from a galvanic battery, K, (see Fig. 3,) to the lever 5. 8 is another wire leading from the post 6 to a registering electro-magnet, $n$, of a construction substantially similar to that used in the Morse telegraph, and 9 is the return-wire from the said electro-magnet to the battery K.

The magnet $n$ has an armature, 10, attached to one end of a lever, 11, which, when the armature is attracted by the magnet when the circuit is closed in the lever 5 and post 6, causes the point of a style, 12, attached to the opposite end of the said lever, to be brought into contact with a strip of paper, 13, (see Fig. 2,) passing round a roller, $q$, to which strip of paper a uniform, or nearly uniform, movement at a speed of about one-fourth inch per second is given, so that when once during every one or more revolutions of the wheel by whose movement on the track the registration of distance is to be effected the magnet $n$, by the closing of the circuit, is charged for a given time, according to whether the train is proceeding forward or backing, and the slide $h$ or $i$ is projected from the wheel $f$, the armature is attracted, and the style 12 is caused to make in the paper a mark or indentation of a less or greater length, or, in other words, a dot or a dash, as is exhibited in the line of marks $x'\ x'$ in Fig. 6, which represents the surface of the strip of paper 13 with the registration of time and distance upon it.

If the paper 13 were drawn under the roller $q$ with a perfectly-uniform speed of so much per second or other interval of time, the velocity of the train could be measured by measuring the distances between the marks of the style 12; but as this would be difficult, a record of every second or other interval of time is made on the same strip of paper in the form of two small dots close to each other, as shown in the line $y'\ y'$ in Fig. 6. These dots are made by a two-pointed style, 16, attached to one end of a lever, 15, at whose opposite end is the armature 14 of an electro-magnet, $o$, which is connected by wires 17 with a battery, $l$. (See Fig. 3.)

The electric circuit of the battery $l$ is closed once in every second or other chosen interval of time, to charge the magnet $o$ and attract the armature 14 by causing the small lever $r$, (see Figs. 1 and 3,) to come in contact with a pin, 18.

The lever $r$ is actuated to produce the above result by means of a toothed wheel, 19, which is so connected with or caused to derive motion from a clock, D, or other time-keeper that it revolves once in a stated period of time, and has such a number of teeth that one will strike and move the lever at the intervals of time required for the registration—for instance, the said wheel revolving once in a minute and having sixty teeth, so that the lever is moved to close the circuit and cause the style to make a mark on the paper every second. By removing one of the teeth of this wheel 19 the failure of the lever to be actuated to close the circuit when this toothless sixtieth division of the wheel passes it will cause a blank space to be left in the line of registration of seconds, and these spaces will form a registration of minutes.

The movement of the lever $r$ is provided for without removing it out of the circuit by furnishing it with a pin, 60, dipping into a cup of mercury, 61.

The two characters of registration above described, and represented in the lines $x'\ x'$ and $y'\ y'$ of Fig. 6—the one of distance and the other of time—will show by comparison, on inspection, the manner in which the train has traveled, indicating the number of revolutions per second and minute or other spaces of time over any part of the road of the wheel from which the measurement of distance is taken, the number of seconds or minutes the train was stationary at given places, and also the distance backed and time occupied in backing. But for the greater facility of deciphering the record, another registration is made at every mile or half-mile of the journey, or once in every three hundred or other number of revolutions of the wheel, as represented by the red marks between the two lines of registration $x'\ x'$ and $y'\ y'$, (shown in Fig. 6,) by the following means: Near the upper end of the shaft $c$, before described, which carries the wheel $f$, there is a small pinion, 20, (see Figs. 1 and 3,) gearing with a toothed wheel, $s$, that is fitted to rotate on a fixed stud, $t^*$, the proportions of the said wheel and pinion being such that the wheel $s$ shall rotate once for the given number of revolutions of the car-wheel from which the measurement is derived; and to prevent the wheel $s$ from running backward when the train may be backing, (as the backings are a comparatively small distance and do not require this registration,) the pinion 20 is fitted loosely in its shaft and has attached to it a ratchet-wheel, 21, which is engaged by a pawl, $t$, attached to a disk, $t'$, that is fast on the shaft $c$, in such a manner as to compel the said pinion 20 to turn with the shaft only when the train moves forward.

On the wheel $s$ is a sharp-edged stud or projection, $s^*$, which, coming in contact with a similar projection on a lever, 22, attached to a pillar, $22^*$, supported on the framing A, throws the said lever into contact with a spring, 63, and for an instant closes a third electric circuit from a battery, $m$, through wires 31, so as to charge a third electro-magnet, $p$, (see Figs. 1, 2, and 3,) and attract the armature 64 thereof, which is attached to one end of a lever, 65, to the opposite end of which is attached a style, 23, which is thus thrown upward and caused to make a mark on the strip of paper 13 between the lines of registration $x'$ $x'$ and $y'$ $y'$ of distance and time.

The armature-levers 11, 15, and 65, it is almost needless to say, have springs applied, or are weighted to remove the styles out of contact with the strip of paper 13 when the circuits through their respective magnets are not closed.

The parts of the apparatus that are in the several electric circuits are, of course, insulated.

When the train stops at a station the battery $m$ is not in use. I therefore propose that the engineer or conductor of the train make use of a key suitably placed, but not represented in the drawings, to close and open the circuit of the said battery through the magnet $p$ by means of a separate branch of connecting-wires, and by a given number of pulsations or strokes of the key (the strip of paper being still in motion) make such a number of marks or characters which (the stations being known by numbers) will indicate all the stoppages at stations, and thus facilitate the interpretation of the registration.

The strip of paper 13 is supplied to the roller $q$ from a reel of paper, 24, suitably placed and sustained in bearings in brackets 25, and a friction-weight or retarding-spring is to be made use of to cause the paper to run off the reel uniformly. The strip of paper conducted by the guide $q'$ is passed from the roller $q$ (see Fig. 2) onto a revolving cylinder, $v$, that is moved at a speed so as to properly draw the paper beneath the roller $q$ by means of clock-work and gearing B, moved by a weight, 66, (see Fig. 2,) attached to a barrel, 26, (see Fig. 3,) and regulated in its velocity by the fly 27, or by a balance. The cylinder $v$ has thus given to it the desired uniform rotation, and it has also given to it a movement endwise, so as to rewind the strip of paper 13 upon it in a helical form, in order to expose the whole surface of the strip, or at least the registrations thereon, to the inspection of the officer whose duty it is to see that the train has been run according to instructions.

The endwise movement of the cylinder is produced by the following means, (best shown in Figs. 3 and 5, the latter of which is a longitudinal central section of the said cylinder:) The shaft 28 of the said cylinder, which derives motion from the clock-work, is fitted easily to the limbs of the cylinder, but is provided with a feather, 29, running in a groove in the hub 30. The shaft 28 is bored out longitudinally and centrally from one end about half-way through, to receive a screw-shaft, $w$, that is supported and held stationary by a standard, $x$, said screw-shaft being connected with the shaft 28 at 67 (see Fig. 5) in such manner as to allow the latter to revolve, but not to allow the screw to move longitudinally, and a tooth, $y$, secured to the hub $30^*$, so as to enter the screw-thread on the shaft $w$, causes the cylinder to be drawn endwise along its shaft by the revolution of the tooth $y$ on the screw-thread as the cylinder is caused to revolve with the shaft 28 by the feather 29 on the said shaft.

The standard $x$ should be so fitted that it can be readily disengaged from the screw-shaft $w$ and hinged to turn down out of the way of the cylinder $v$, which, when the tooth is moved back out of the screw-thread, can be slid off for inspection and another substituted, and after the record has been examined the helical strip of paper is removed from the cylinder, which is again made ready for use by replacing it in the screw $w$ and shaft 28 and turning up the standard $x$ into place.

The whole apparatus, except the finger-key before referred to, might be inclosed in a locked compartment of the car, out of the reach of the engineer and any or all persons on the train, suitable doors being left for access to the different parts by the proper persons.

The apparatus is capable of considerable modification without changing the character of its operation. The strip or fillet of paper might be run off into a suitable box or case, to be examined by passing it through the hand, instead of being wound on a cylinder. In this case the roller $q$ will have to be moved at the proper speed to draw along the paper. The styles 12 16 23 might be made to mark on a sheet of a paper wrapped around a cylinder, instead of on the strip of paper to be wound thereon, and by having the sheet of paper prepared with suitable chemicals (as prussiate of potash, &c., as used in Bain's electro-chemical telegraph) the magnets might be dispensed with, the electric current making marks in the chemically-prepared paper; or an impression might be made by the action of magnetism on the styles with the use of transfer-paper between the pressure and the receiving paper, to transfer some of the coloring-matter to the receiving-paper from the transfer-paper. The contrivance for producing the long and short pulsations of electricity to distinguish the forward from the backward movements might be varied in many ways.

Should it be desired, electricity may be dispensed with altogether, and the registering-marks, substantially such as described, may be produced by levers actuated by mechanical force transmitted from the running-gear of the train. Magnetism is, however, to be preferred on account of the greater convenience and delicacy of its action.

The clock-work B, which drives the winding-cylinder $v$, may be wound up by hand or by power derived from the revolution of the running-gear through suitable ratchets and gearing.

Having thus fully described my invention, I wish it to be particularly understood that I do not confine myself to the use of any of the particular mechanical devices herein described, nor to the use of any particular marks or characters in the several registrations, as such may be varied and modified without departing from the principle of my invention; but

What I claim as new, and desire to secure by Letters Patent, is—

1. The method herein described of recording the performance of a railway-train on its journey by the combination of a registration of time and one or more registrations of distance, such registrations being made in lines parallel with or contiguous to each other, to show by comparison with each other the speed, movements, and stoppages of the train, substantially as specified.

2. The indication of the backward movements of the train by a registration of a different character to that of the forward movements, but in the same relation to the registration of time, so as to show the time occupied and the distance passed over in backing, and to enable such distance to be deducted from the distance run forward and the distance run from the starting-point to be correctly ascertained.

LEWIS TROOST.

Witnesses:
W. TUSCH,
J. F. BUCKLEY.